Figure 1:
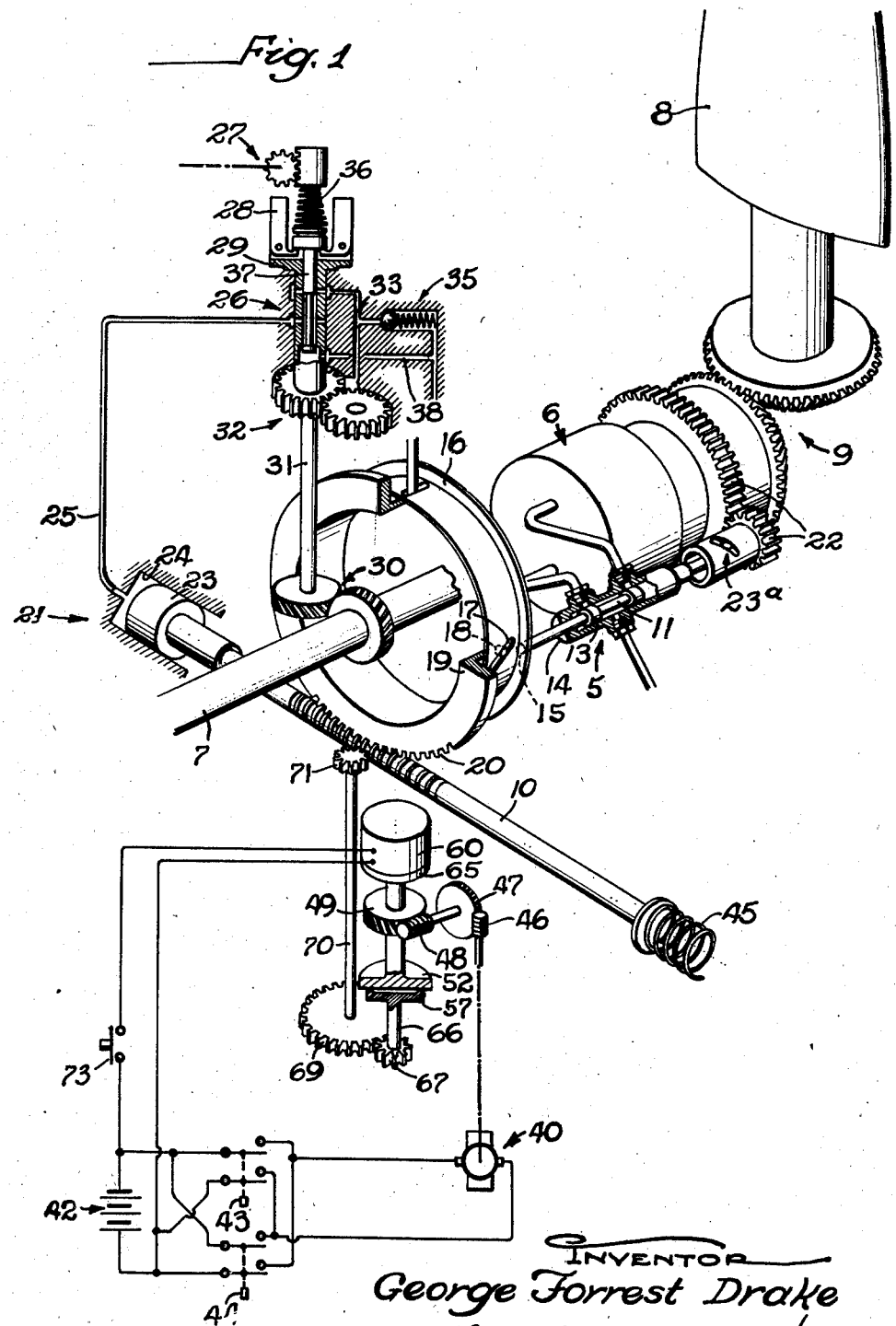

July 29, 1947.   G. F. DRAKE   2,424,559
CONTROL FOR VARIABLE PITCH PROPELLERS
Filed Nov. 26, 1943   2 Sheets-Sheet 1

INVENTOR
George Forrest Drake
By Parker, Carlson, Pitner & Hubbard
ATTORNEYS

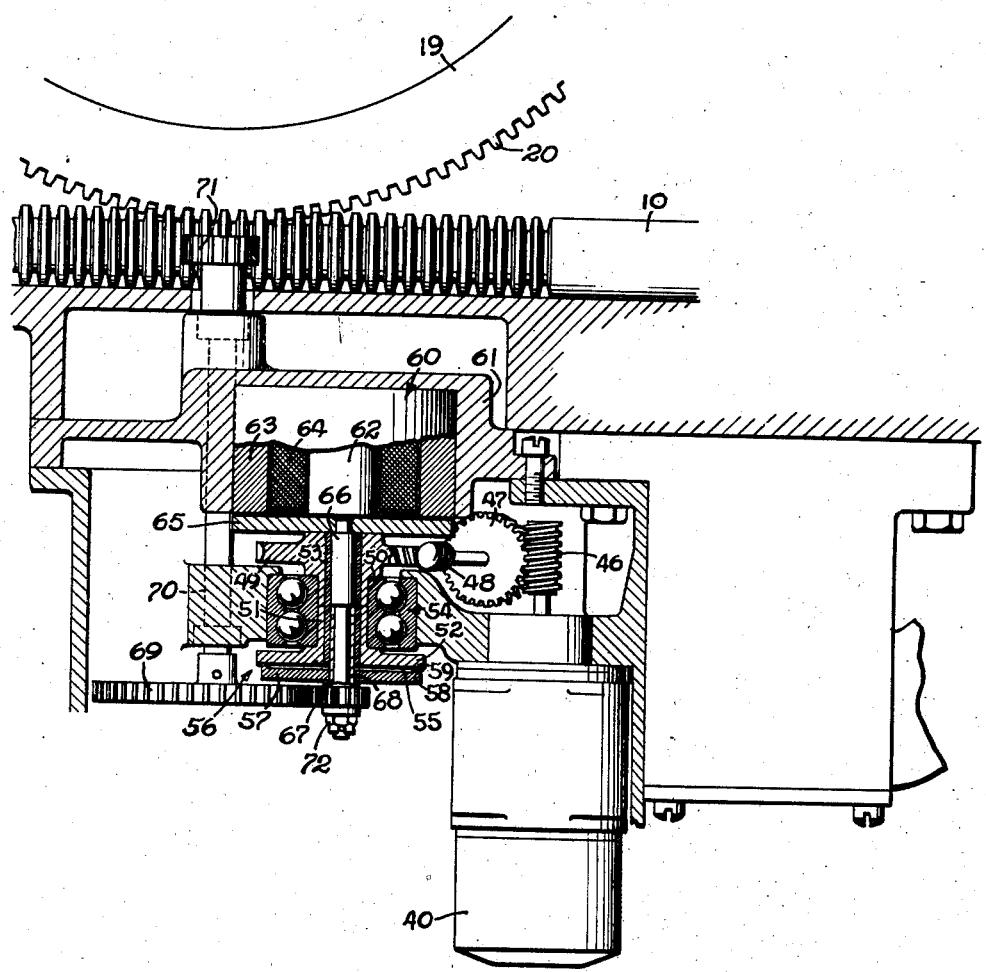

Patented July 29, 1947

2,424,559

UNITED STATES PATENT OFFICE 2,424,559

CONTROL FOR VARIABLE PITCH PROPELLERS

George Forrest Drake, Rockford, Ill., assignor to Woodward Governor Company, Rockford, Ill., a corporation of Illinois Application November 26, 1943, Serial No. 511,820

5 Claims. (Cl. 170—163)

1

This invention relates to the control of variable pitch propellers, particularly those of the hydraulic type.

The primary object is to provide a novel auxiliary actuating mechanism for effecting pitch adjustment of the propeller under abnormal or emergency conditions.

A more detailed object is to provide a novel electric actuator for the propeller pitch adjusting mechanism which actuator is adapted to supplement and overcome the normally operable hydraulic actuating mechanism under emergency conditions.

The invention also resides in the novel character of the structure employed to carry out the foregoing objects.

Other objects and advantages of the invention will become apparent from the following detailed description taken in connection with the accompanying drawings, in which Figure 1 is a schematic view of a variable pitch propeller and its actuating mechanism arranged to be controlled in accordance with the present invention.

Fig. 2 is a fragmentary plan view of the auxiliary actuator.

The present invention is particularly applicable to the control of pitch changing mechanism of the type forming the subject matter of an application filed by John E. Anderson, Serial No. 482,265, and to a governor control forming the subject matter of an application Serial No. 517,686 by Erle Martin and Murray C. Beebe, Jr., to which applications reference may be made for further details. This mechanism which is illustrated diagrammatically in the drawings includes a relay valve 5 which governs the flow of pressure fluid to and from a hydraulic servo actuator 6 incorporated in the assembly of a propeller driven by a power shaft 7 and having blades, one of which is shown at 8. Through bevel gears 9, the actuator is adapted to turn the propeller blades back and forth to the proper pitch setting which is determined by the position of a control rod or rack 10 mounted on a non-rotatable part. In this instance, the valve 5 turns with the propeller assembly, and its movable member 11 has lands 13 cooperating with ports in the valve casing 14. The valve member 11 projects from the casing 14, and its end 15 bears against a nonrotatable plate 16 that is shifted back and forth axially in accordance with changes in the axial position of the control rack 10. For this purpose, slots 17 on the plate 16 coact with pins 18 on a ring 19 having peripheral gear teeth 20 which mesh with

2 rack teeth on the rod 10. Thus, by moving the rod 10 to a desired position, the plate 16 and the rotating valve structure will be shifted axially to a corresponding position. The pitch adjusting motion of the servo 6 resulting from such a change operates through gears 22 and a pin and slot connection 23a to shift the valve casing 14 so that the latter follows up the movement of the valve member 11 and interrupts the flow of fluid to or from the servo when the propeller blade pitch has been changed to correspond to the changed position of the control rod 10.

In normal operation, the control rod 10 is shifted automatically back and forth to adjust the pitch of the blades 8 for the maintenance of a selected constant engine speed. This is accomplished by a servo actuator 21 comprising a piston 23 operating in a stationary cylinder 24 and connected to one end of the rod 10. The flow of pressure fluid to and from the cylinder 24 through a conduit 25 is regulated by a pilot valve 26 actuated by a governor 27 of the type disclosed in Woodward Patent No. 2,204,640 having flyballs 28 which are supported on a head 29 driven from the engine shaft 7 through gears 30 and a shaft 31. A gear pump 32 driven from the shaft 31 supplies pressure fluid to the valve 26 through a conduit 33 from which the fluid may be bypassed to the drain through an automatic valve 35 to maintain a constant supply pressure.

The speed at which the propeller operates is determined by the adjustment of a speeder spring 36 acting on the valve plunger 37. In response to a speed increase above the selected setting, the plunger 37 is raised by the flyballs admitting pressure fluid to the cylinder 24 so as to shift the rod 10 to the right, as viewed in Fig. 1, and produce an increase in the blade pitch. In response to a speed decrease, the plunger 37 is lowered, and the valve 26 permits fluid to drain from the cylinder 24 through a conduit 38, the movement of the control rod 10 in this case being produced by a compression spring 45 acting between a stationary abutment and the end of the control rod opposite the cylinder 24.

The present invention contemplates the provision of an auxiliary actuator for maintaining or changing the position of the control rod 10 independently of the hydraulic actuator 21. This auxiliary actuator includes a reversible direct current motor 40 which may have a permanent magnet field, as shown in Fig. 1, and be reversed by changing the direction of current flow through the motor armature. Such flow from a battery 42 is controlled by push buttons 43 and 44 which may be located at a remote point of control. Power from the motor is transmitted to the control rod 10 through a driving connection which is disengageable to permit free movement of the control rod 10 by its hydraulic actuator 21 and which includes speed reduction gearing of the irreversible type for preventing movement of the control rod 10 by the hydraulic actuator when the driving connection is engaged and the motor 40 is idle. In the present instance, the self-locking gearing comprises a worm 46 fast on the motor shaft meshing with a worm wheel 47 which drives a second worm 48 meshing with a worm wheel 49.

As shown in Fig. 2, the hub 50 on the worm wheel 49 has an interengageable jaw coupling with the end of a hub 51 on a rigid metal plate 52. The two hubs are on a bushing 53 and are journaled in a double ball thrust bearing 54 by which the plate 52 is held against axial displacement. The flat face 55 of the plate constitutes one element of a magnetic friction clutch 56, the other element of which comprises a plate 57 having an annular rib 58 near its periphery with a narrow radial face 59 adapted for gripping engagement with the face 55 when the plates are drawn together by energization of an electromagnet 60. The latter is mounted in a nonmagnetic part of a casing 61 which supports the motor 40 and all of the rotating parts of the driving connection. In this instance, the magnet comprises concentric poles 62 and 63 with a winding 64 therebetween. The armature of the magnet comprises a magnetic disk 65 fast on one end of a shaft 66 which is journaled in the bushing 53 and projects through the clutch plate 57 and a pinion 67, both of which are fastened to the shaft through a sleeve 68. The pinion meshes with a gear 69 on one end of a shaft 70 whose other end projects from the casing 61 and carries a pinion 71 meshing with the rack teeth on the rod 10.

The movement of the magnet armature 65 toward the magnet poles when the magnet is energized is limited so that the armature is always spaced a short distance, preferably about .005 of an inch, from the pole faces, so that the armature may rotate freely. Such spacing may be obtained by adjusting a nut 72 to vary the effective length of the shaft 66 on which the armature is supported. Energization of the magnet winding 64 may be controlled by a push button switch 73.

The clutch and its magnet actuator are correlated in construction to provide for effective operation when immersed in oil which fills the casing 61. For this purpose, the coacting friction faces 55 and 59 are of hardened steel and, therefore, are nonabsorbent and long wearing. The total engaging areas of these faces are made so small in proportion to the pull exerted by the magnet that the unit gripping pressure produced when the magnet is energized will be sufficiently high to squeeze the oil out from between the coacting faces. It will be observed that with a clutch of this character, effective engagement may be produced in any relative angular position of the clutch elements, and effective release of the clutch is insured whenever the magnet is deenergized.

In normal operation, the governor unit operates automatically through the hydraulic servo 21 to move the control rack 10 back and forth and through the valve 5 and the servo 6 to adjust the pitch of the propeller blades so as to maintain the engine speed at a constant value. During such movement of the rack by the hydraulic servo, the pinion 71, the gears 67 and 72, the clutch plate 57, and the shaft 66 rotate freely, the clutch magnet 60 being then deenergized. If it is desired to lock the propeller blades at a given pitch as, for example, during carburetor adjustment, it is only necessary to energize the magnet 60, thereby pulling the two clutch plates tightly together. Since the worm gearings are not reversible, power supplied by the hydraulic servo 21 or the spring 45 cannot be transmitted back through the gearing to drive the motor 40, and neither the servo or the spring exerts sufficient force to slip the clutch. The governor is thus disabled, and the propeller blades are locked effectively.

Adjustment of the blade pitch by remote manual control, as, for example, to feather or unfeather the propeller, may be effected by closing the switch 73 to energize the magnet 60 and engage the clutch, and then closing one or the other of the control switches 43 or 44 to run the motor 40 in the proper direction. The control rack 10 is thus shifted in a corresponding direction until the closed switch is opened, stopping the motor. The magnet 60 may be left energized so that the clutch holds the control rack 10 fixed, the propeller blades then being held at the selected pitch. While the control rack 10 is being moved by the motor 40 to the left, as viewed in Fig. 1, the fluid in the cylinder 24 is compressed sufficiently to open the valve 35 and be released. In the reverse movement of the rack, fluid from the drain may be drawn into the cylinder 24 through the valve 26.

I claim as my invention:

1. The combination with a variable pitch propeller of, a member movable back and forth varying distances to adjust the pitch of said propeller, a hydraulic actuator for said member, a governor driven in unison with said propeller and automatically regulating the energization of said actuator to maintain the speed of said propeller constant, a reversible electric motor, a driving connection between said motor and said member including an irreversible worm gearing operable to prevent the motor to be driven by said actuator, said connection also including a clutch interposed between said member and said gearing and releasable to permit movement of said member by said actuator or engageable to lock the member against movement by the actuator, and valve means operable automatically to release fluid from said actuator during movement of said member in one direction by said motor.

2. The combination with a variable pitch propeller of, a member movable back and forth varying distances to adjust the pitch of said propeller, a hydraulic actuator for said member, a governor automatically responsive to the speed of said propeller and regulating the energization of said actuator, a reversible electric motor, and a driving connection between said motor and said member including self-locking worm gearing operable to prevent the motor to be driven by said actuator, said connection also including a clutch interposed between said member and said gearing and releasable to permit movement of said member by said actuator or engageable to lock the member against movement by the actuator.

3. The combination with a variable pitch propeller of, mechanism for adjusting the pitch of said propeller including a member movable in opposite directions, a hydraulic actuator for said member, an auxiliary actuator for said member capable of overcoming said hydraulic actuator and comprising a reversible electric motor, self-locking gearing driven by said motor but operable to prevent the transmission of power reversely to the motor, and a disengageable driving connection between said gearing and said member operable to hold the member against the force of said hydraulic actuator when the connection is engaged and the motor is idle and permitting movement of the member by said hydraulic actuator when the connection is disengaged.

4. The combination with a variable pitch propeller of, mechanism for adjusting the pitch of said propeller including a member movable in opposite directions and a hydraulic actuator for the member, an auxiliary actuator for said member capable of overcoming said hydraulic actuator and comprising a reversible electric motor, speed reduction gearing driven by said motor, a disengageable driving connection between said gearing and said member operable to hold the member against the force of said hydraulic actuator when the connection is engaged and the motor is idle, and means associated with said connection and operable to prevent the transmission of power reversely to the motor.

5. The combination with a variable pitch propeller of, mechanism for adjusting the pitch of said propeller including a member movable in opposite directions, a primary power actuator for said member, an auxiliary power actuator for said member capable of overcoming said actuator and moving said member independently, said auxiliary actuator comprising a reversible electric motor, self-locking gearing driven by said motor but operable to prevent the transmission of power reversely to the motor, and a disengageable clutch interposed in the driving connection between said gearing and said member operable to hold the member against the force of said primary actuator when said clutch is engaged and the motor is idle and permitting movement of the member by said primary actuator when the clutch is disengaged.

GEORGE FORREST DRAKE.

REFERENCES CITED

The following references are of record in the file of this patent:

UNITED STATES PATENTS

| Number | Name | Date |
| --- | --- | --- |
| 2,333,973 | Beebe | Nov. 9, 1943 |
| 2,207,042 | Waseige | July 9, 1942 |
| 2,127,687 | Heath | Aug. 23, 1938 |
| 2,327,217 | Reiber et al. | Aug. 17, 1943 |
| 1,622,939 | Bing | Mar. 29, 1927 |
| 2,267,114 | Lear et al. | Dec. 23, 1941 |

FOREIGN PATENTS

| Number | Country | Date |
| --- | --- | --- |
| 485,878 | Great Britain | May 26, 1938 |
| 792,955 | France | Jan. 14, 1936 |